No. 607,620. Patented July 19, 1898.
W. A. KEMP.
PIPE ELBOW.
(Application filed Sept. 23, 1897.)
(No Model.) 2 Sheets—Sheet 1.

Witnesses:
Henry L. Deck
Chas. F. Burkhardt

W. A. Kemp, Inventor
By Wilhelm Bonner
Attorneys

No. 607,620. Patented July 19, 1898.
W. A. KEMP.
PIPE ELBOW.
(Application filed Sept. 23, 1897.)
(No Model.) 2 Sheets—Sheet 2.

Witnesses:
Henry L. Deck.
Chas. F. Burkhardt.

W. A. Kemp,
Inventor,
By Wilhelm Bonner,
Attorneys.

THE NORRIS PETERS CO., PHOTO-LITHO., WASHINGTON, D. C.

UNITED STATES PATENT OFFICE.

WILLIAM A. KEMP, OF TORONTO, CANADA.

PIPE-ELBOW.

SPECIFICATION forming part of Letters Patent No. 607,620, dated July 19, 1898.

Application filed September 23, 1897. Serial No. 652,737. (No model.)

*To all whom it may concern:*

Be it known that I, WILLIAM A. KEMP, a subject of the Queen of Great Britain, residing at Toronto, in the county of York, in the Province of Ontario, Dominion of Canada, have invented new and useful Improvements in Pipe-Elbows, of which the following is a specification.

This invention relates to that class of pipe-elbows which are made of sheet metal, particularly stovepipe-elbows, and which are radially crimped or corrugated, and has the object to improve and simplify the construction of such elbows and to produce them more expeditiously and economically than heretofore.

In making my improved pipe-elbow a blank of sheet metal of proper size is first corrugated transversely and rather coarsely. The blank is then bent up into tubular form, so that the corrugations extend circumferentially around the tube and the longitudinal edges of the blank overlap each other. The corrugated part of the pipe is then compressed in the axial direction of the pipe, whereby the corrugations are brought closely together, and the lapped parts along the joint are secured together, and the pipe is finally bent to the form of an elbow with the corrugated and compressed lap-joint on the inner side of the elbow, whereby the corrugations are spread or distended on the outer or circumferential side of the elbow.

Figure 1:
Figure 2:
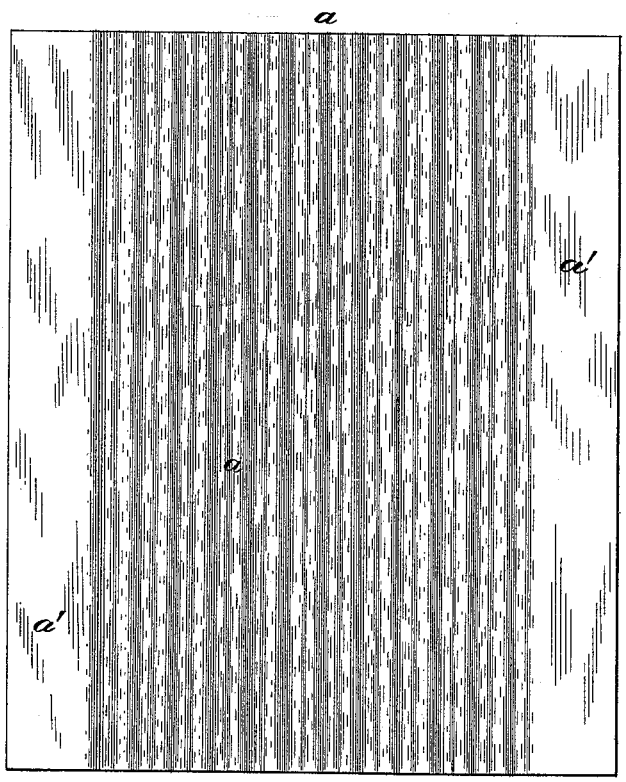
Figure 3:
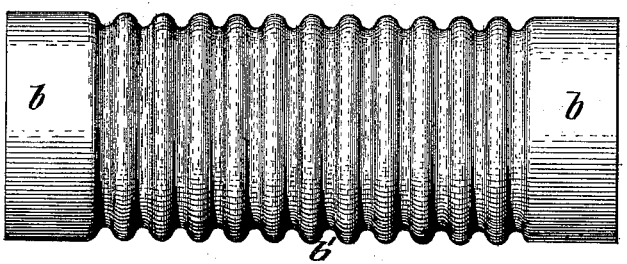
Figure 4:
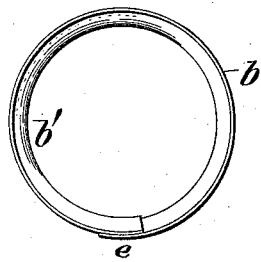
Figure 5:
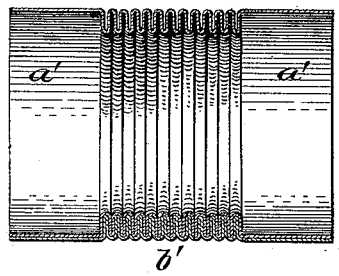
Figure 6:
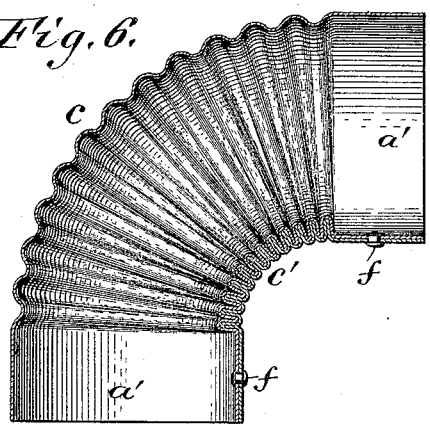
Figure 7:
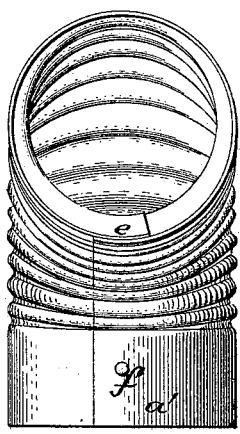

In the accompanying drawings, consisting of two sheets, Figure 1 is an edge view of the sheet-metal blank after the same has been coarsely corrugated. Fig. 2 is a top plan view of the same. Fig. 3 is a side elevation showing the corrugated blank rolled into a tube or pipe. Fig. 4 is an end view of the same. Fig. 5 is a longitudinal section of the corrugated pipe or tube, showing the corrugations compressed. Fig. 6 is a similar view showing the pipe or tube bent into the form of an elbow. Fig. 7 is an end view of the same.

Like letters of reference refer to like parts in the several figures.

The blank from which the pipe-elbow is made consists of a rectangular sheet of any suitable kind of metal. If the elbow to be produced is a stovepipe-elbow, a suitable grade of sheet-iron is used. This sheet is first provided intermediate of its ends with a number of transverse corrugations $a$, which extend from one longitudinal side of the sheet to the other, leaving an uncorrugated portion $a'$ at each end of the sheet, as represented in Figs. 1 and 2. The corrugations are comparatively coarse, and while forming the same in the sheet the latter is not confined, thereby permitting of shortening the blank and avoiding stretching or weakening of the metal. The corrugated blank is next formed into a pipe or tube by bending or rolling the blank transversely, so that the end portions of the blank receive a cylindrical form, as shown at $b$, Figs. 3 and 4, and the corrugations extend circumferentially around the central portion of the pipe, as shown at $b'$ in the same figures. In forming the corrugated blank into a tube or pipe the longitudinal edge portions of the blank are lapped one over the other, as shown at $e$, Fig. 4, with one end of each corrugation lying on the opposite end of the same corrugation. The corrugations are next compressed endwise and uniformly by means of any suitable compressing machine or apparatus, so that they are forced closely together around the entire circumference of the pipe, thereby shortening the pipe, as represented in Fig. 5, and firmly binding or interlocking the overlapping corrugated portions of the pipe which form the lap-joint. After the corrugations have been so compressed the pipe is bent into elbow form or so that one end stands at an angle to the other end, as represented in Fig. 6. During the operation of bending the pipe the portions of the corrugations on the outer or circumferential side of the elbow are again distended or stretched apart, as shown at $c$, Fig. 6, while the portions of the corrugations on the inner or throat side of the elbow remain in their closely-compressed condition, as shown at $c'$ in the same figure. The corrugated pipe is bent with the joint or overlapping portions arranged on the inner or throat side of the elbow, so that the longitudinal corrugated edge portions of the pipe remain firmly interlocked, thereby forming a joint along the throat side of the pipe which is sufficiently tight and requires no other or additional fastening.

This method of making pipe-elbows permits of making the same out of a low and cheap grade of sheet metal, because the metal is not stretched to any considerable extent at any stage during the manufacture of the elbow. The edges of the sheets do not require to be squared, as no seaming is required to secure the longitudinal edges together. The time required for making the elbow is reduced to a minimum, the required operations are of the simplest kind, and the elbow is in this manner produced at very low cost, while being very strong and also very attractive in appearance.

The overlapping parts of the uncorrugated end portions of the elbow may be secured together by rivets $f$, if desired.

I claim as my invention—

A sheet-metal elbow having a simple lap-joint at its inner or throat side and having corrugations which extend without break circumferentially around the elbow at the outer curve thereof and which are pressed against each other at the inner or throat side of the elbow, whereby the two thicknesses of the lap-joint are clamped together while the elbow is composed of a single thickness of corrugated metal at the outer side, substantially as set forth.

Witness my hand this 20th day of September, 1897.

WILLIAM A. KEMP.

Witnesses:
H. FRANCES,
F. MCCARTHY.